July 26, 1938.  G. Q. HEPPNER  2,124,919
AGRICULTURAL IMPLEMENT
Filed Aug. 3, 1937  4 Sheets-Sheet 4
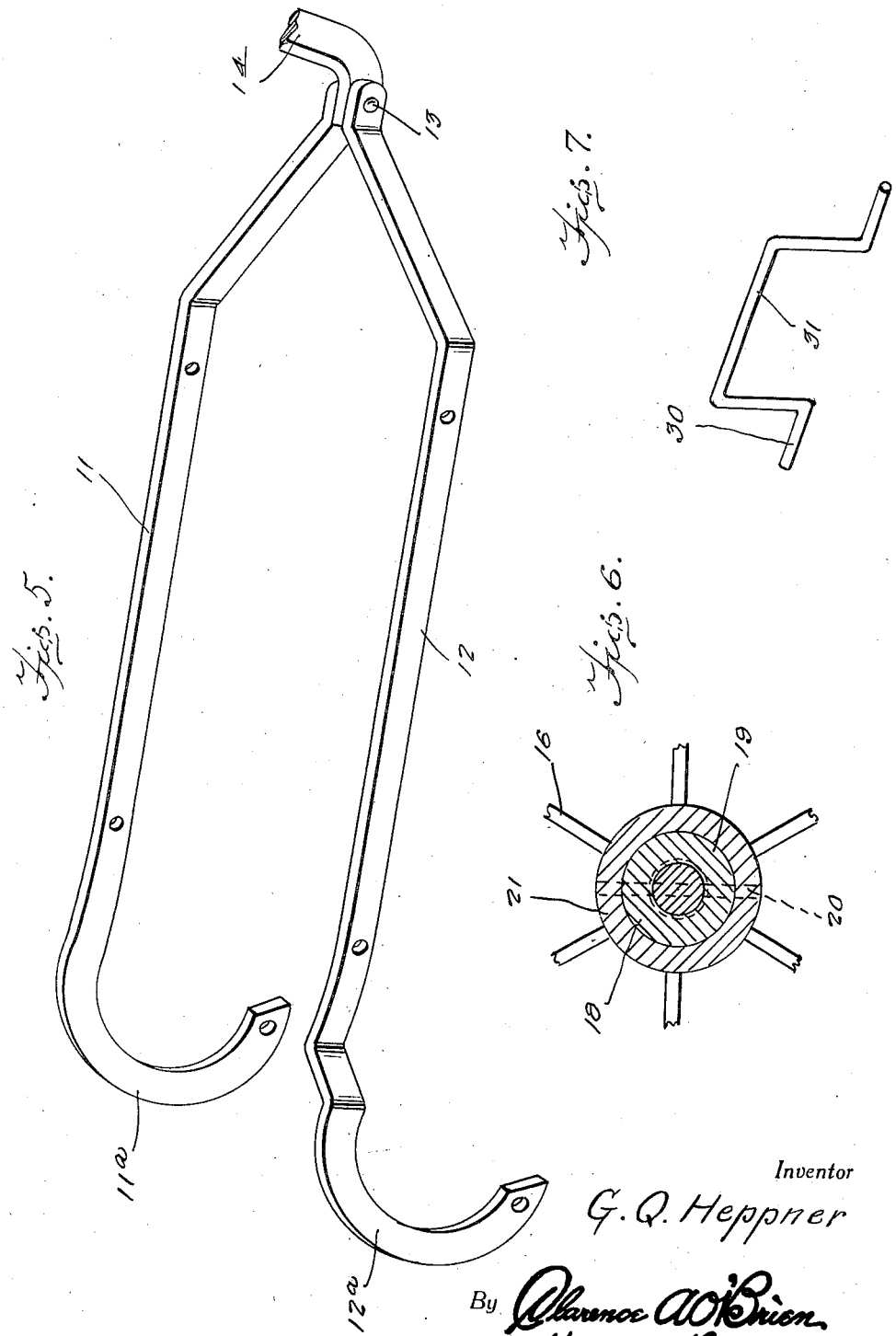
Inventor
G. Q. Heppner
By Clarence A. O'Brien
Hyman Berman
Attorneys Patented July 26, 1938

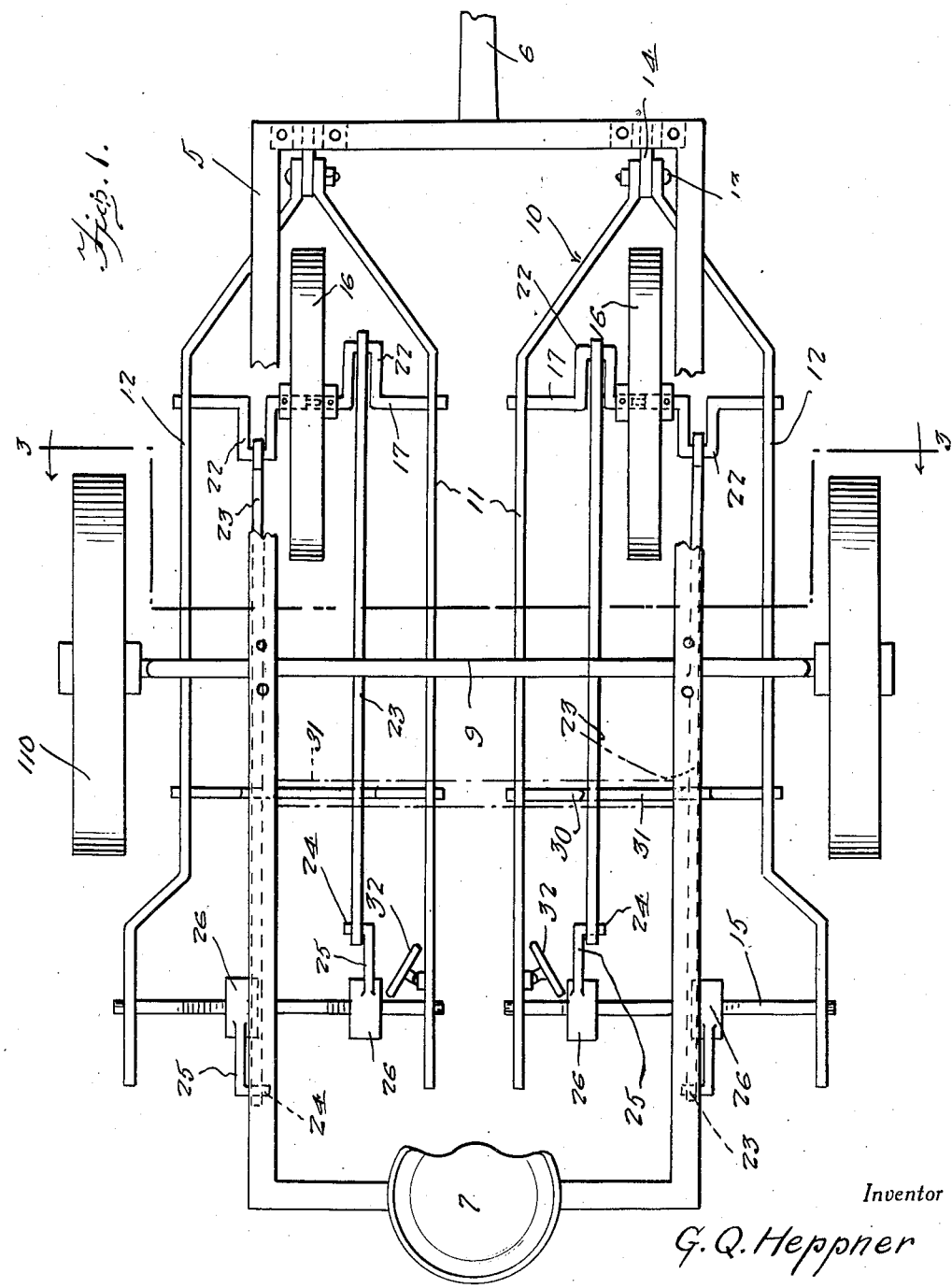

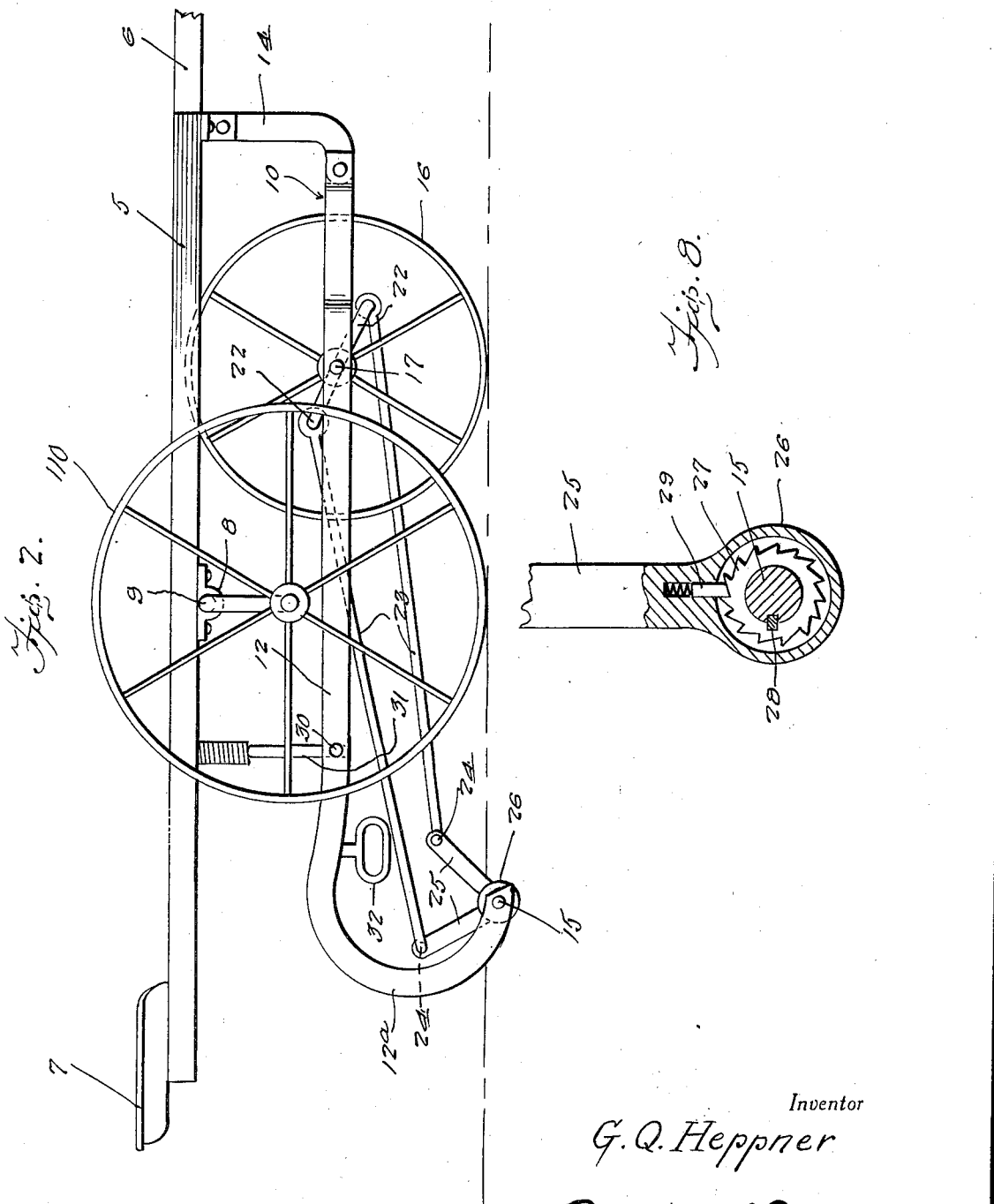

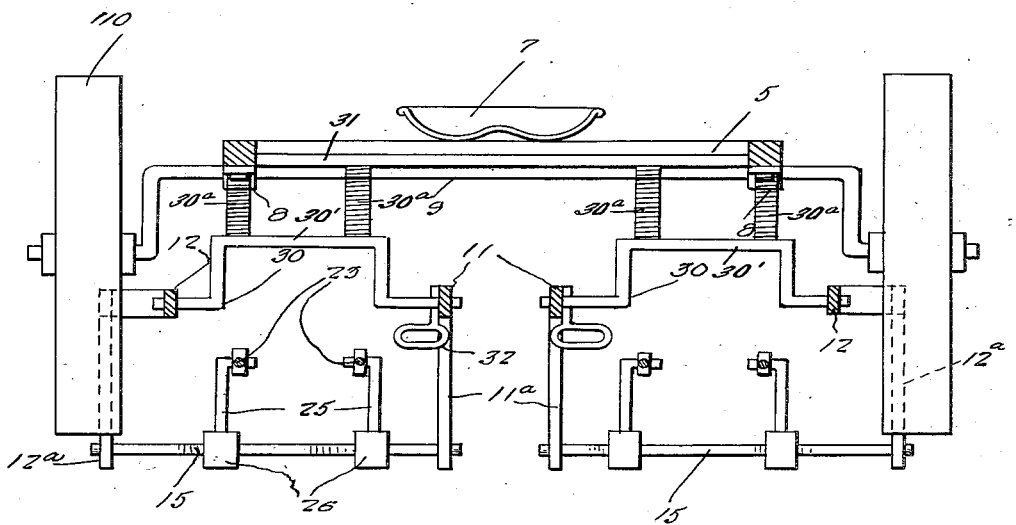
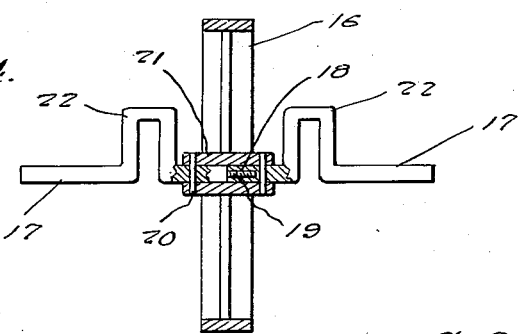

2,124,919

UNITED STATES PATENT OFFICE 2,124,919

AGRICULTURAL IMPLEMENT

George Q. Heppner, Oldenburg, Ind.

Application August 3, 1937, Serial No. 157,186

3 Claims. (Cl. 97—42)

This invention relates generally to agricultural implements, and more particularly to that class of implements known as weeders and used for uprooting the weeds or breaking the same from their roots; and the invention together with its objects and advantages will be best understood from a study of the following description taken in connection with the accompanying drawings, wherein:

Figure 1 is a top plan view of the weeder.

Figure 2 is a side elevational view thereof.

Figure 3 is a transverse sectional view taken substantially on the line 3—3 of Fig. 1.

Figure 4 is a detail sectional view through a drive wheel with portions of the axle therefor broken away and shown in section.

Figure 5 is a perspective view of a rig frame.

Figure 6 is a fragmentary detail sectional view taken through one of the drive wheels and illustrating certain details hereinafter more fully referred to.

Figure 7 is a perspective view of a brace rod and

Figure 8 is a detail sectional view of a dog and ratchet assembly hereinafter more fully referred to.

Referring to the drawings by reference numerals it will be seen that the weeder is of the rotary rod type and comprises a main frame 5 equipped at its forward end with a draft tongue 6 and at its rear end with a seat 7 for the operator.

Intermediate its ends the sides of the frame 5 are provided with bearings 8 that support an axle 9 on the ends of which are provided the traction wheels 110.

In the present instance, the implement is shown as provided with two rigs, each of which is indicated generally by the reference numeral 10.

Each rig 10 includes a frame including an inner frame member 11 and an outer frame member 12 and the frame members 11 and 12 at one end converge toward one another and terminate in parallel apertured lugs through the medium of which and a bolt 13 said frame members are pivoted to a hanger bracket 14 secured to and depending from the forward end of the frame 5.

As shown the outer frame member 12 at its free or rear end is offset laterally outwardly and at their free ends the frame members 11 and 12 terminate in depending substantially C-shaped beams or extensions 11a, 12a. The extensions 11a, 12a at their terminals are apertured to provide bearings for the ends of a rotary rod 15.

For driving or rotating the rod 15 each rig is provided adjacent its forward end with a wheel 16 for which an axle 17 is provided.

Axle 17 is suitably supported between the members 11 and 12 and comprises a pair of sections one of which is provided with a threaded pin 18 at one end thereof and the other of which is provided with an internal threaded sprocket 19 at one end thereof to receive the pin 18 whereby the two sections of the axle are detachably secured together.

At the detachably connected ends of the axle sections there is secured to said sections through the medium of pins 20 the hub 21 of the aforementioned wheel 16.

The outer free ends of the axle sections 17 are suitably journaled in openings provided therefor in the rig members 11 and 12.

Axle sections 17 are provided with cranks or "throws" 22 with which are engaged one end of pitman rods 23.

The pitman rods 23 are pivoted as at 24 to levers 25 formed integral with ratchet wheel housings 26 disposed about the rotary rod 15 which latter, except for the extremities thereof, is squared in cross section as will be clear from a consideration of Fig. 1 of the drawings. If, and as shown, it be desired, rod 15 is provided at intervals with circular portions, it is concentric to these circular portions that the parts 26 of levers 25 are disposed.

Keyed to the said circular portions of the rod 15 are ratchet wheels 27, the keys connection between the wheels 27 and the rod 15 being indicated by the reference numeral 28 and clearly illustrated in Fig. 8.

For transmitting movement of the levers 25 to the rod 15 said levers are equipped with suitable spring pressed dogs 29 that engage the ratchet wheels 27 in a manner also clearly shown in Fig. 8.

It will thus be seen that as wheel 16 revolves drive is transmitted from the axle 17 and through the links or connecting rods 23 to the levers 25 causing the latter to oscillate. Obviously as levers 25 oscillate dogs 29 are brought into engagement with successive teeth of the ratchet wheels 27 so that weeder rod 15 is caused to continuously rotate in a counterclockwise direction.

Adjacent the beam equipped ends thereof rig frame members 11 and 12 are braced relative to one another through the medium of a transverse brace rod 30, the intermediate portion of which is formed into a substantial inverted U.

Suitably secured to the U-shaped portions 30' of the braces are the lower ends of coil springs 30a. The outermost coil springs 30a at their upper ends bear against the underside of the side members of frame 5 while the innermost springs 30a at their upper ends bear against a cross bar 31 extending between intermediate portions of the side members of frame 5 as best shown in Figure 3. It will thus be seen that springs 30a will act on the braces 30 to normally urge the beams 11a, 12a of the respective rigs vertically downwardly.

Also to facilitate controlling the digging depth of the rotary rods 15 there are suitably mounted on the side frame members 11 of rigs 10 adjacent the rear ends of side members stirrups 32 to accommodate the feet of the operator whereby the legs of the operator may be utilized for vertically swinging the rigs 10 and thereby control the digging depth of the weeding rotary rods 15.

It will thus be seen that as the weeder is drawn over the ground wheels 16 in contact with the ground will rotate for transmitting drive in a manner hereinbefore described in detail to the rotary rods 15 for rotating the rods, continuously, for effectively uprooting the weeds.

It is thought that a clear understanding of the construction, utility and advantages of a rotary rod weeder of the character embodying the features of the present invention will be had without any more detailed description thereof.

Having thus described the invention what is claimed as new is:

1. In a rotary rod weeder, the combination of a frame, a pair of supporting wheels disposed adjacent the sides of said frame, a bracket depending from the frame at the forward end of the latter, a rig pivoted at one end to said bracket, an axle transversely journaled in said rig and provided with a pair of cranks, a ground engaging drive wheel mounted on said axle for rotating the latter, a transversely extending rotary rod supported by said rig at the rear end of the latter and adapted to penetrate the ground and means connected with said rotary rod and said axle for driving said rotary rod from said axle.

2. In a rotary rod weeder, a wheel supported frame, a rig pivoted at one end to the forward end of the frame, a rotary rod supported by said rig at the rear end of the latter and adapted to penetrate the ground, an axle journaled in said rig adjacent the forward end of the latter, a ground engaging wheel fixed on said axle, said axle being provided with a pair of cranks, ratchet wheels mounted on said rotary rod, levers having annular portions disposed circumjacent said rotary rod and substantially enclosing said ratchets, dogs carried by said levers and engageable with the ratchets for transmitting movement of the lever to the rod for rotating the latter continuously in one direction, and connecting rods connecting the cranks of said axle with said levers for oscillating the latter and thereby drive said rotary rod from said axle.

3. In a rotary rod weeder, a wheel supported frame provided with draft means at one end and a seat at its rear end, a pair of rigs pivoted at their forward ends to the forward end of said frame, each of said rigs including a pair of side members having substantially C-shaped free rear end portions, a transverse rotary rod supported by said C-shaped end portions and adapted to penetrate the ground, an axle supported between the side members of each rig and having end journaled in said side members, a ground engaging wheel fixedly mounted on said axle, and means for driving said rotary rod from said axle; and one of the side members of each rig adjacent the rear end thereof being provided with a stirrup to accommodate the foot of the occupant of said seat whereby the legs of the occupant may be utilized for adjusting the rigs vertically to control the digging depth of the rotary rods.

GEORGE Q. HEPPNER.